(12) United States Patent
Hayashi et al.

(10) Patent No.: US 6,452,762 B1
(45) Date of Patent: Sep. 17, 2002

(54) MAGNETO-RESISTIVE ELEMENT AND PRODUCTION METHOD THEREOF, MAGNETO-RESISTIVE HEAD, AND MAGNETIC RECORDING/REPRODUCING APPARATUS

(75) Inventors: Kazuhiko Hayashi; Masafumi Nakada, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/535,742

(22) Filed: Mar. 27, 2000

(30) Foreign Application Priority Data

Apr. 8, 1999 (JP) .......................................... 11-101490

(51) Int. Cl.[7] .............................................. G11B 5/39
(52) U.S. Cl. ................................................... 360/324.1
(58) Field of Search ........................ 360/324.1, 324.11, 360/324.12, 324.2

(56) References Cited

U.S. PATENT DOCUMENTS 5,390,061 A * 2/1995 Nakatani et al. ......... 360/324.2
5,898,547 A * 4/1999 Fontana, Jr. et al. ..... 360/324.2
5,905,611 A * 5/1999 Yoda et al. ............... 360/324.1

FOREIGN PATENT DOCUMENTS

| JP | 2-61572 | 1/1990 |
| JP | 4-358310 | 11/1992 |
| KR | 1998-80211 | 11/1998 |

OTHER PUBLICATIONS

"Thin Film Magnetoresistors in Memory, Storage, and Related Applications", IEEE Trans. on Magnetics, vol. MAG–11, No. 4, Jul. 1975, pp. 1039–1050.
"Perpendicular–Current Transport in Exchange–Biased Spin–Valves", IEEE Trans. on Magnetics, vol. 33, No. 5, Sep. 1997, pp. 3505–3510.
Korean Office Action dated Mar. 28, 2002, with partial English translation.

* cited by examiner

Primary Examiner—David L. Ometz
(74) Attorney, Agent, or Firm—McGinn & Gibb, PLLC

(57) ABSTRACT

The present invention provides a magneto-resistive (MR) element comprising: a first magnetic layer 1 provided on a substrate; a non-magnetic layer 3 arranged to be in contact with the first magnetic layer; and a second magnetic layer 2 arranged to be in contact with the non-magnetic layer; wherein sense current flowing in the first and the second magnetic layer is changed by a resistance change according to an external magnetic field, and a sense current flowing distance in the first magnetic layer and/or a sense current flowing distance in the second magnetic layer is longer than a sense current flowing distance in a superimposed portion of the first magnetic layer, the non-magnetic layer, and the second magnetic layer.

8 Claims, 11 Drawing Sheets

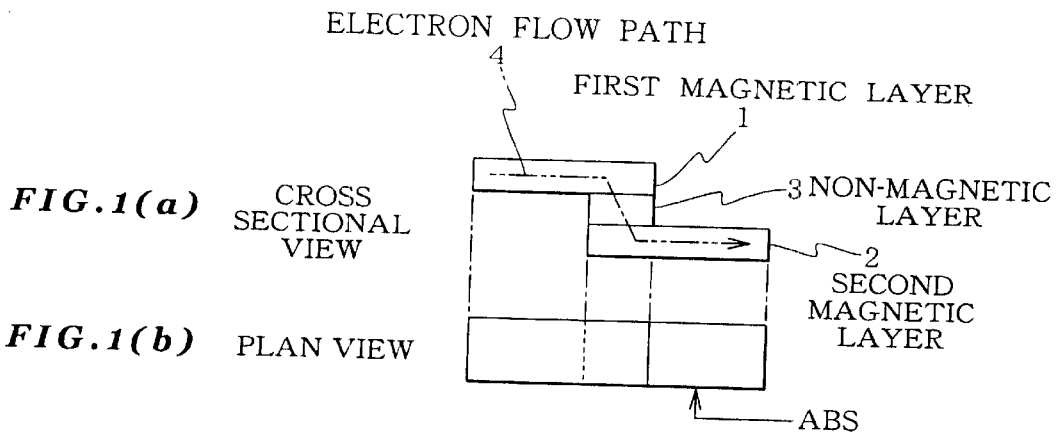
FIG.1(a) CROSS SECTIONAL VIEW
FIG.1(b) PLAN VIEW
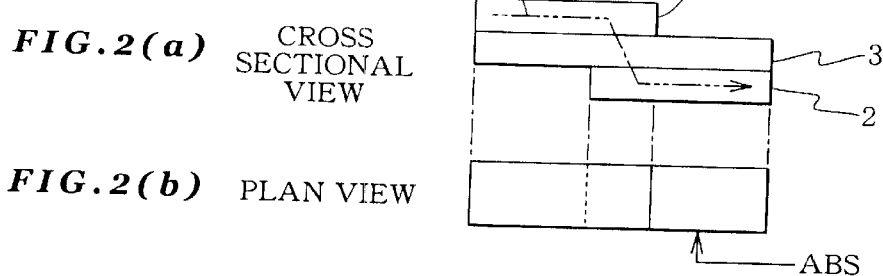
FIG.2(a) CROSS SECTIONAL VIEW
FIG.2(b) PLAN VIEW
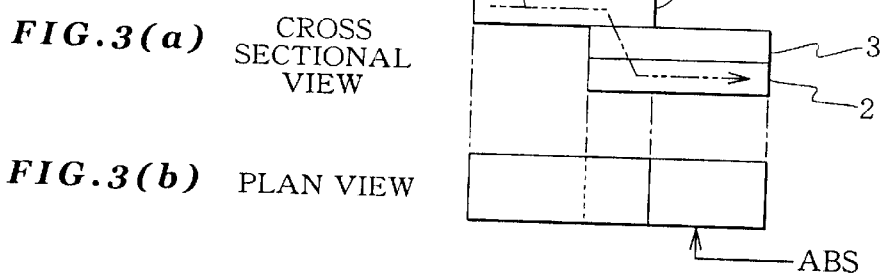
FIG.3(a) CROSS SECTIONAL VIEW
FIG.3(b) PLAN VIEW
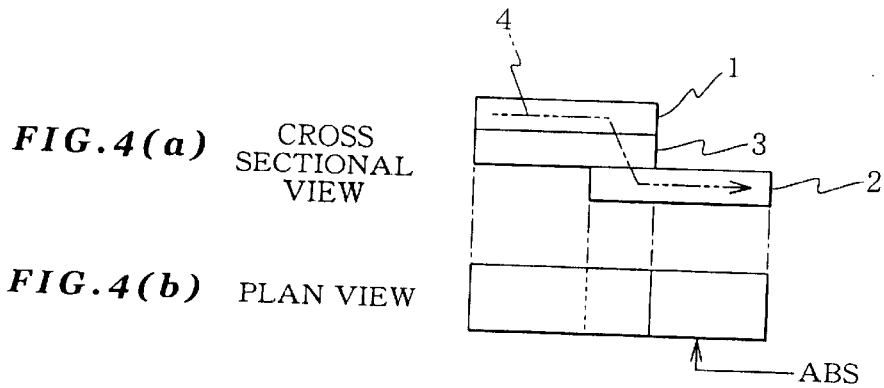
FIG.4(a) CROSS SECTIONAL VIEW
FIG.4(b) PLAN VIEW

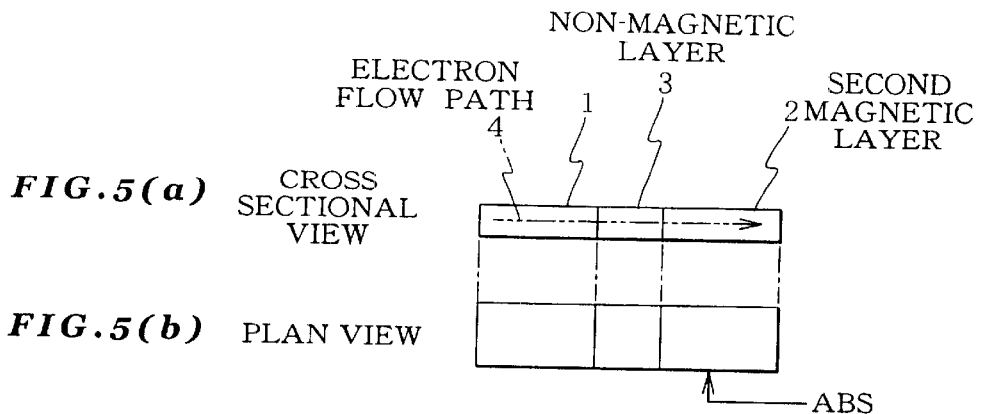
FIG.5(a) CROSS SECTIONAL VIEW
FIG.5(b) PLAN VIEW
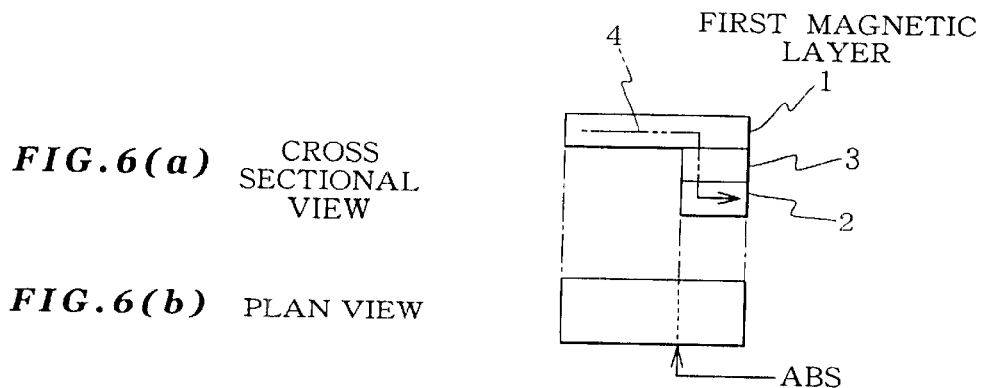
FIG.6(a) CROSS SECTIONAL VIEW
FIG.6(b) PLAN VIEW
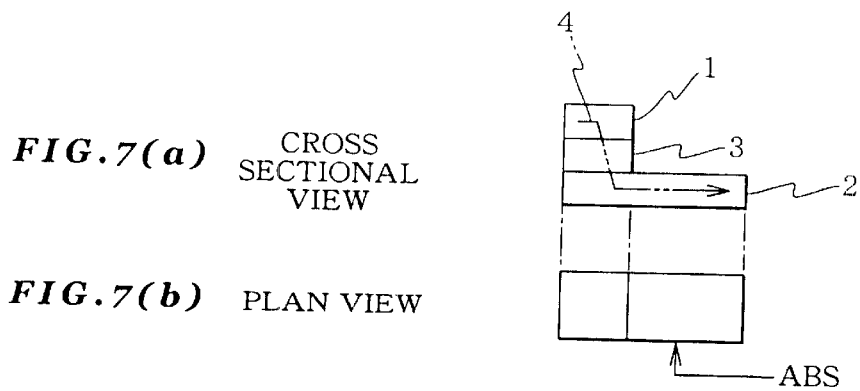
FIG.7(a) CROSS SECTIONAL VIEW
FIG.7(b) PLAN VIEW

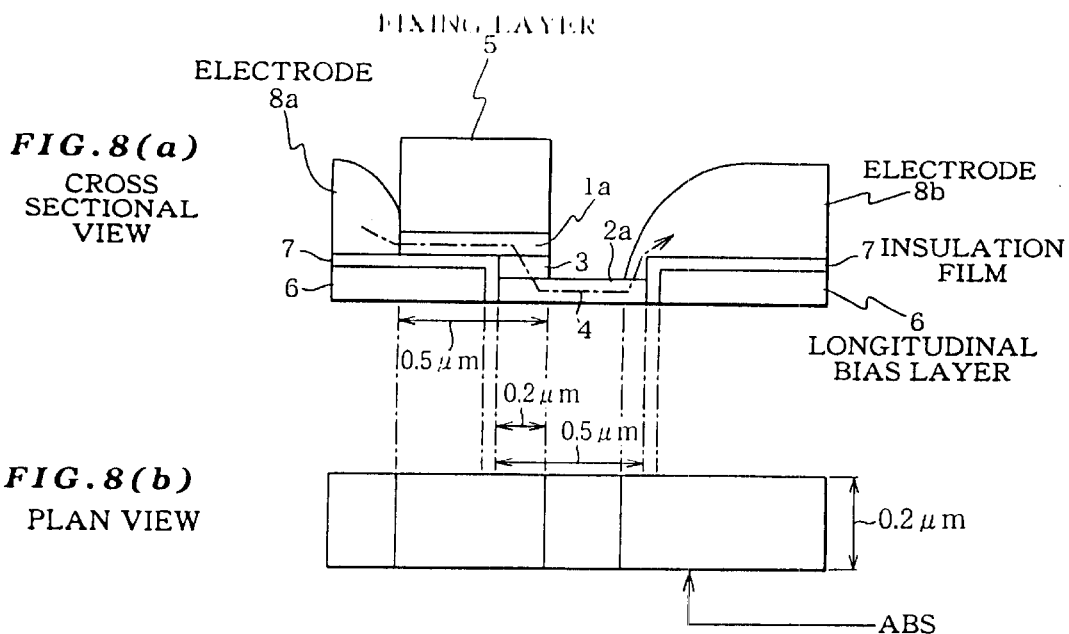
FIG.8(a) CROSS SECTIONAL VIEW
FIG.8(b) PLAN VIEW
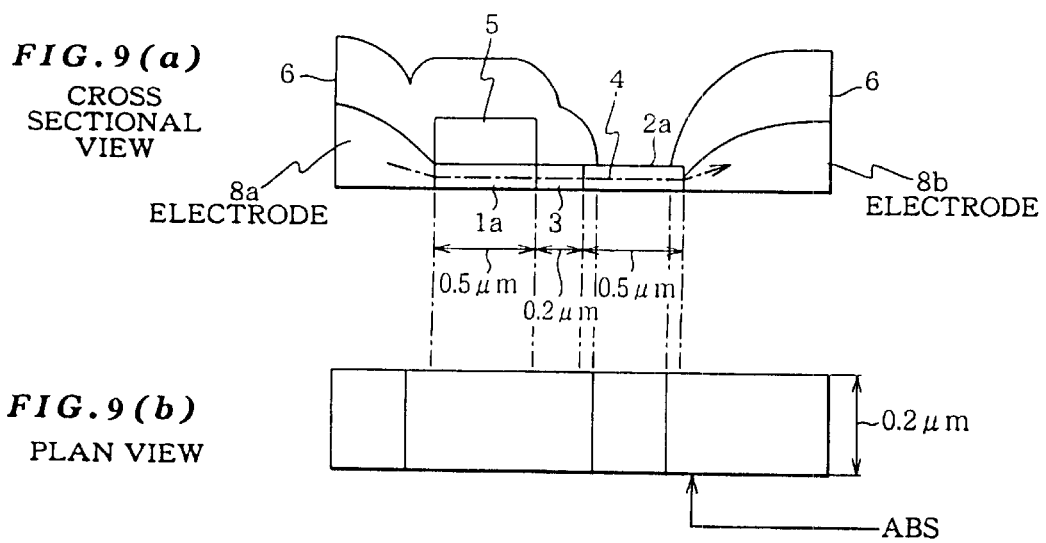
FIG.9(a) CROSS SECTIONAL VIEW
FIG.9(b) PLAN VIEW

CROSS SECTIONAL VIEW

PLAN VIEW

20
SUBSTRATE 1a  2a

26
UPPER SHIELD
LAYER

2a 7   1a  2a   7
INSULATION
FILM 8a            8b

26
UPPER SHIELD
LAYER 3      2a
INSULATION
FILM

8b 8a  1a  2a

20
SUBSTRATE 1a  2a
3

26
UPPER SHIELD
LAYER

2a 8a   8a 8a   8b

26
UPPER SHIELD
LAYER 3   2a

INSULATION
FILM 8a   8b 6   6

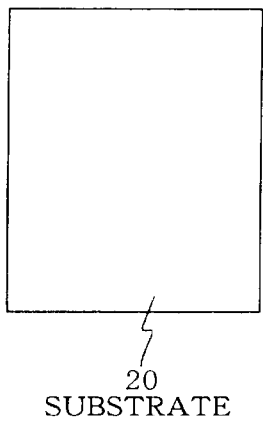
*FIG.15(a)*
20
SUBSTRATE
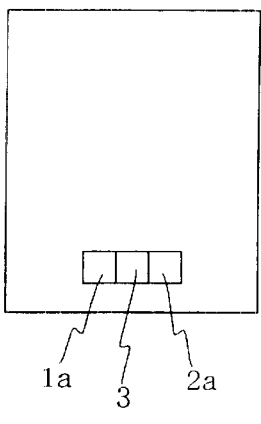
*FIG.15(d)*
1a  3  2a
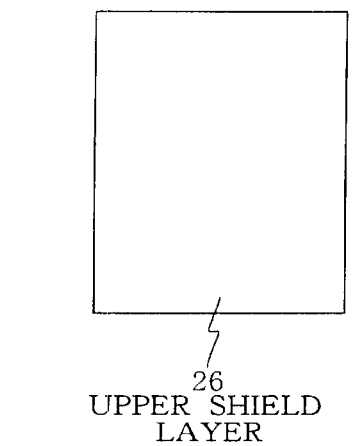
*FIG.15(g)*
26
UPPER SHIELD
LAYER
*FIG.15(b)*
2a
*FIG.15(e)*
8a  8a
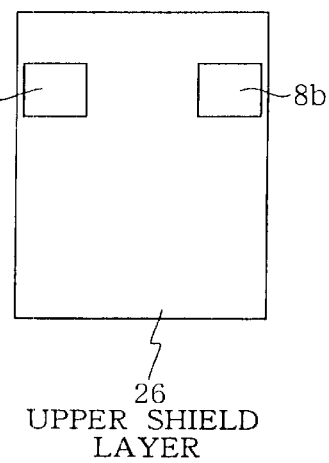
*FIG.15(h)*
8a  8b
26
UPPER SHIELD
LAYER
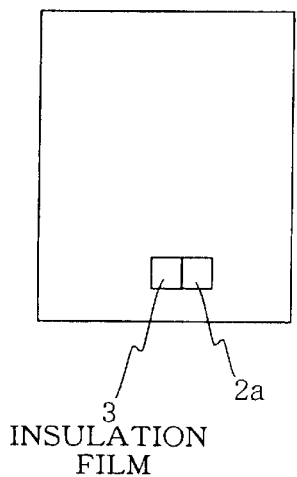
*FIG.15(c)*
3  2a
INSULATION
FILM
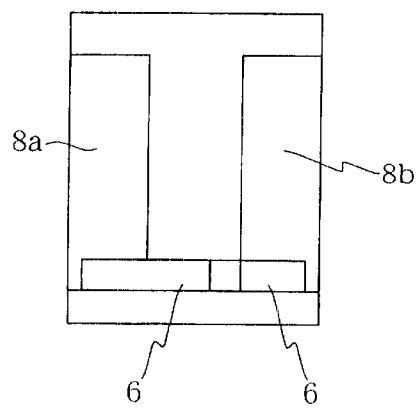
*FIG.15(f)*
8a  8b
6  6

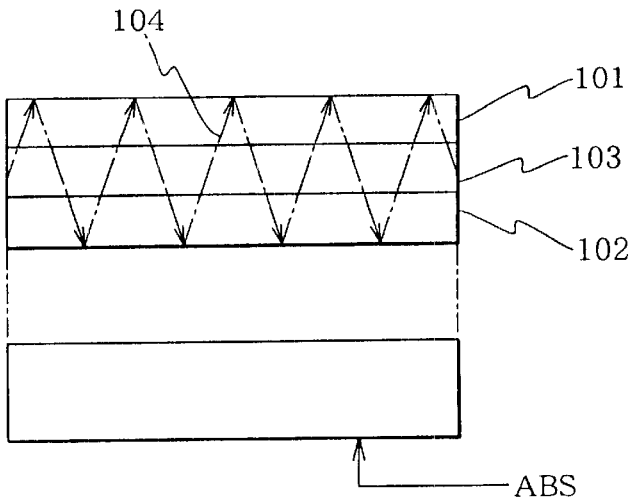
*FIG.18(a)* CROSS SECTIONAL VIEW PRIOR ART
*FIG.18(b)* PLAN VIEW PRIOR ART
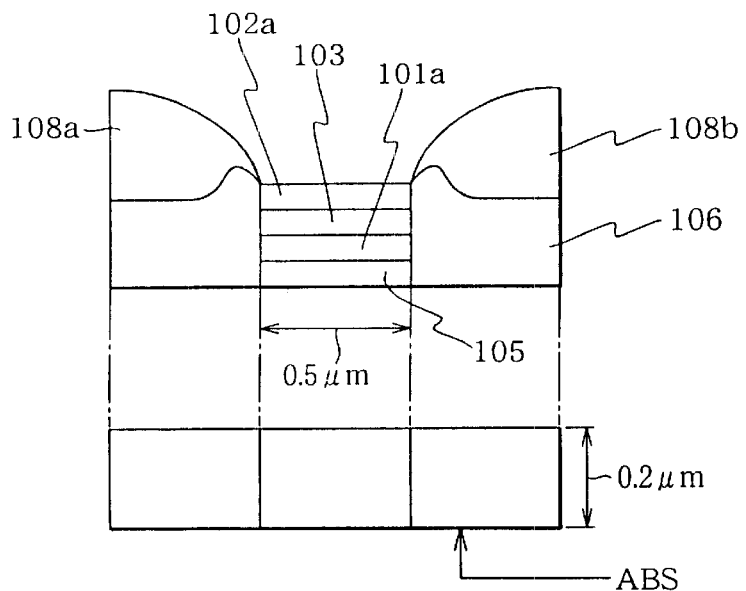
*FIG.19(a)* CROSS SECTIONAL VIEW PRIOR ART
*FIG.19(b)* PLAN VIEW PRIOR ART

MAGNETO-RESISTIVE ELEMENT AND PRODUCTION METHOD THEREOF, MAGNETO-RESISTIVE HEAD, AND MAGNETIC RECORDING/REPRODUCING APPARATUS

BACKGROUND OF THE INVENTION

1. Field of the Invention

The present invention relates to a magneto-resistive (MR) element and its production method, an MR head and magnetic recording/reproducing apparatus and in particular, a magneto-resistive (MR) element for reading an information signal recorded on a magnetic recording medium and its production method, an MR head and a magnetic recording/reproducing apparatus.

2. Description of the Related Art

Conventionally, there has been disclosed a magnetic reading converter called an MR sensor or MR head as a technique of a hard disc drive. These can read a data from a magnetic surface with a large linear density.

The MR sensor detects a magnetic field signal according to a resistance change as a function of intensity and direction of a magnetic flux detected by a read element. Such a conventional MR sensor operates according to the effect of anisotropic magneto resistance (AMR) in such a way that a component of resistance of the read element changes in proportion to square of cosine of the angle between the magnetization direction and the sense current direction flowing in the element. The AMR effect is detailed in D. A. Thompson "Memory, Storage, and Related Applications", IEEE Trans. on Mag. MAG-11, p 1039 (1975).

In a magnetic head using the AMR effect, longitudinal bias is often applied in order to suppress the Barkhausen noise. The longitudinal bias may be realized by an antiferromagnetic material such as FeMn, NiMn, nickel oxide or the like.

Furthermore, more remarkable magnetoresistivity has been disclosed. That is, the resistance change of a layered magnetic sensor is based on a spin dependent transmission of conductive electrons between magnetic layers via a non-magnetic layer and accompanying spin dependent scattering on the layer boundary. Such a magnetoresistivity is called "giant magnetoresistivity", "spin bulb effect", and the like. Such an MR sensor is made from an appropriate material and enables to improve sensitivity and increase the resistance change in comparison with a sensor using the AMR effect.

In this type of MR sensor, the resistance of a plane between a pair of ferromagnetic layers separated by a non-magnetic layer changes in proportion to the cosine of an angle defined by the magnetization directions in the two ferromagnetic layers.

On the other hand, Japanese Patent Publication 2-61572 discloses a layered magnetic configuration which brings about a high MR change generated by anti-parallel arrangement of magnetization in the magnetic layers. The layered configuration is made from ferromagnetic transition metals or alloys. Moreover, it is disclosed that at least one of the two ferromagnetic layers separated by an intermediate layer preferably has a fixing layer added and that the fixing layer of the magnetization direction is preferably formed from FeMn.

Japanese Patent Publication 4-358310 discloses that in an MR film having a basic configuration of a ferromagnetic layer, a non-magnetic layer, and a ferromagnetic layer, the areas of the two ferromagnetic layers (free layer and fixed layer) are identical to the area of the non-magnetic layer and a detection current is made to flow in parallel to the film surface.

The IEEE Transactions on Magnetics, vol. 33, No. 5, September 1997, pp 3505–3510, for example, discloses in an MR film having a basic configuration of a ferromagnetic layer, a non-magnetic layer, and a ferromagnetic layer, the areas of the two ferromagnetic layers (free layer and fixed layer) are identical to the area of the non-magnetic layer and a detection current is made to flow vertically to the film surface.

FIG. 18 shows a representative conventional magneto-resistive (MR) element. As shown in FIG. 18 (a), a non-magnetic layer 103 is sandwiched by a first magnetic layer 101 and a second magnetic layer 102. Moreover, as shown in FIG. 18(b), the first magnetic layer 101, the second magnetic layer 102, and the non-magnetic layer 103 have end surfaces as ABS (air bearing surface).

FIG. 19 shows an example of the magneto-resistive (MR) element of FIG. 18 applied to a reproduction head. As shown in FIG. 19(a), the magneto-resistive (MR) element includes a fixing layer 105, a fixed layer 101a, a non-magnetic layer 103, and a free layer 102a which are sandwiched by a longitudinal bias layer 106. On the longitudinal bias layer 106, electrodes 108a and 108b are provided. Moreover, as shown in FIG. 19(b), the fixed layer 101a, the free layer 102a, and the non-magnetic layer 103 have end surfaces as ABS.

However, such a conventional magneto-resistive (MR) element having a basic configuration of the free layer, the non-magnetic layer, and the fixed layer has various problems. As is clear from FIG. 19(a) and (b), when viewed from the top, in the conventional configuration, the free layer 102a has an identical area to the fixed layer 101a.

In such a magneto-resistive (MR) element, when a sense current is made to flow in a horizontal direction (CPI: current in the plane), before electrons are sufficiently spin-polarized in one of the free layer 102a and the fixed layer 101a, the electrons move to the other layer. Thus, only much smaller resistance change is obtained than can be expected from the magnetic materials used.

On the other hand, in a magneto-resistive (MR) element in which sense current is made to flow vertically (CPP: current perpendicular to the plane), when the free layer 102a and the fixed layer 101a have a sufficient thickness, the electron spin-polarization is sufficiently realized and it is possible to obtain a resistance change near to the one that can be expected originally.

However, when an actual application as a reproduction head is considered, the free layer 102a preferably has a small thickness for critical sensitivity increase. Moreover, the fixed layer 101a also preferably has a small thickness, because this increases the value of exchange coupling field applied from the fixed layer 101a to the fixing layer 105 adjacent to the fixed layer 101a and opposite to the non-magnetic layer 103, and improves the magnetic stability of the fixed layer 101a. Furthermore, when the free layer 102a and the fixed layer 101a have a small thickness, the static magnetic coupling between these layers is reduced, which facilitates zero point positioning at magnetic field zero applied.

Consequently, in the CPP, the free layer 102a and the fixed layer 101a should have a film thickness as thin as possible. However, if the film thickness is small, there arises a problem that the resistance change is significantly decreased.

As has been described above, the conventional configuration including CIP and CPP provides a resistance change much smaller than can be expected from the material band configuration of the free layer 102a and the fixed layer 101a.

SUMMARY OF THE INVENTION

It is therefore an object of the present invention to provide a magneto-resistive (MR) element which enables to obtain a higher reproduction output than in the conventional magneto-resistive (MR) element and which can be produced with a higher yield, and a production method thereof, an MR head and a magnetic recording/reproducing apparatus.

The magneto-resistive (MR) element according to the present invention comprises: a first magnetic layer provided on a substrate; a non-magnetic layer arranged to be in contact with the first magnetic layer; and a second magnetic layer arranged to be in contact with the non-magnetic layer; wherein sense current flowing in the first and the second magnetic layer is changed by a resistance change according to an external magnetic field, and a sense current flowing distance in the first magnetic layer and/or a sense current flowing distance in the second magnetic layer is longer than a sense current flowing distance in a superimposed portion of the first magnetic layer, the non-magnetic layer, and the second magnetic layer.

When the substrate is viewed from a direction vertically intersecting the main surface of the substrate, the superimposed portion of the first magnetic layer and the second magnetic layer may have an area smaller than each of the first magnetic layer and the second magnetic layer.

On the other hand, the MR head according to the present invention comprises: a magneto-resistive (MR) element claimed in claim 1 or claim 2 and provided on a substrate; a first electrode mounted on the first magnetic layer; a second electrode mounted on the second magnetic layer; and a fixing layer arranged to be in contact with the first magnetic layer for fixing the magnetization direction of the first magnetic layer.

On the other hand, the magnetic recording/reproducing apparatus according to the present invention comprises: a magnetic recording medium having a plurality of tracks for recording a data; a magnetic recording head for storing data in the magnetic recording medium; the MR head claimed in claim 3 or 4; and actuator means for moving the magnetic recording head and the MR head to a desired track on the magnetic recording medium.

Moreover, the magnetic recording medium may be a hard disc.

BRIEF DESCRIPTION OF THE DRAWINGS

FIG. 1 shows a magneto-resistive (MR) element according to a first embodiment of the present invention. FIG. 1(a) is a cross sectional view and FIG. 1(b) is a plan view.

FIG. 2 shows a magneto-resistive (MR) element according to a second embodiment of the present invention. FIG. 2(a) is a cross sectional view and FIG. 2(b) is a plan view.

FIG. 3 shows a magneto-resistive (MR) element according to a third embodiment of the present invention. FIG. 3(a) is a cross sectional view and FIG. 3(b) is a plan view.

FIG. 4 shows a magneto-resistive (MR) element according to a fourth embodiment of the present invention. FIG. 4(a) is a cross sectional view and FIG. 4(b) is a plan view.

FIG. 5 shows a magneto-resistive (MR) element according to a fifth embodiment of the present invention. FIG. 5(a) is a cross sectional view and FIG. 5(b) is a plan view.

FIG. 6 shows a magneto-resistive (MR) element according to a sixth embodiment of the present invention. FIG. 6(a) is a cross sectional view and FIG. 6(b) is a plan view.

FIG. 7 shows a magneto-resistive (MR) element according to a seventh embodiment of the present invention. FIG. 7(a) is a cross sectional view and FIG. 7(b) is a plan view.

FIG. 8 shows a magneto-resistive (MR) element according to a eighth embodiment of the present invention. FIG. 8(a) is a cross sectional view and FIG. 8(b) is a plan view.

FIG. 9 shows a magneto-resistive (MR) element according to a ninth embodiment of the present invention. FIG. 9(a) is a cross sectional view and FIG. 9(b) is a plan view.

FIG. 10 shows a magneto-resistive (MR) element according to a tenth embodiment of the present invention.

FIG. 15(a)–15f are plan showing a production method of the MR head of FIG. 10.

FIG. 18 shows a conventional magneto-resistive (MR) element. FIG. 18(a) is a cross sectional view and FIG. 18(b) is a plan view.

FIG. 19 shows a conventional MR head. FIG. 19(a) is a cross sectional view and FIG. 19(b) is a plan view.

DESCRIPTION OF THE PREFERRED EMBODIMENTS

Figure 10A:
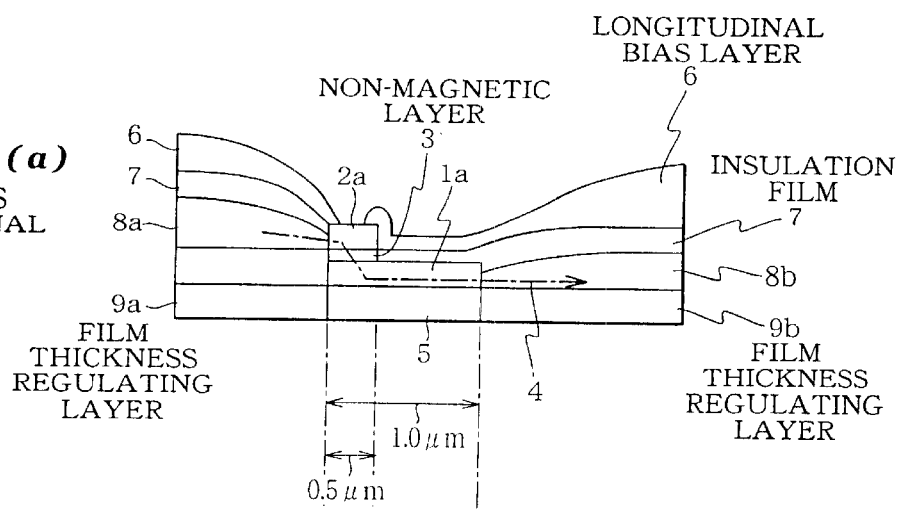
FIG. 10(a) is a cross sectional view and FIG. 10(b) is a plan view.

Description will now be directed preferred embodiments with reference to the attached drawings.

Embodiment 1

FIG. 1 shows a first embodiment of the present invention. As shown in FIG. 1(a), a first magnetic layer 1 and a second magnetic layer 2 have a rectangular shape and are partially superimposed as shown in FIG. 1(b). At the superimposed portion, there is provided a non-magnetic layer 3. In this configuration, electrons flow a longer distance in the first magnetic layer 1 and the second magnetic layer 2 than in the superimposed portion. While the electrons flow through the first magnetic layer 1, the electrons are spin-polarized by the filter effect and passes through the non-magnetic layer 3 into the second magnetic layer 2. The electrons are further subjected to filter effect, and the element resistance is changed by the magnetization direction of the first magnetic layer 1 or the magnetization direction of the second magnetic layer 2.

Here, the first magnetic layer 1 corresponds to the fixed layer in the MR head, and the second magnetic layer 2 corresponds to the free layer of the MR head. Accordingly, this embodiment is characterized in that the distance of the sense current flowing in the free layer or the fixed layer is longer than the sense current flowing distance in the superimposed portion of the two magnetic layers.

It should be noted that a magnetic layer where electrons are introduced first is referred to as the first magnetic layer, and a magnetic layer where electrons are introduced after having passed the non-magnetic layer is referred to as the second magnetic layer.

In the aforementioned configuration, if the distance that electrons flow in the first magnetic layer is sufficiently long, when the electrons flow into the second magnetic layer, the resistance is greatly changed according to the magnetization direction. This is because the electrons unified in one direction flow in a sufficiently long distance of the first magnetic layer and is subjected to the filter effect (one of the possible spin directions decides the magnetization direction of the magnetic layer where electrons can easily pass), so that the electrons are sufficiently polarized. Moreover, if the electrons flow a sufficiently long distance in the second magnetic layer, the filter effect sufficiently works and the resistance change is increased.

Accordingly, if the electron flow distance is sufficiently long both in the first magnetic layer and the second magnetic layer, it is possible to obtain the greatest resistance change. According to this principle, it is considered that the electron flow distance should be as long as possible in the first magnetic layer and in the second magnetic layer.

However, actually, electrons have a spin diffusion length (SDL) where the electrons lose the spin information. This limits increase of the magnetoresitance change. That is, when electrons are made to flow more length than SDL, the increase of the magnetoresitance change cannot be obtained. Accordingly, as the SDL increases, the more magnetoresistance change can be expected. Consequently, the merit of the present invention can be obtained by forming a magnetic film having a sufficiently long SDL.

Description will now be directed to the other embodiments.

Embodiment 2

FIG. 2 shows a magneto-resistive (MR) element according to a second embodiment of the present invention. FIG. 2(a) is a cross sectional view and FIG. 2(b) is a plan view. As shown in FIG. 2, the second embodiment is identical to the first embodiment except for that the non-magnetic layer 3 extends to non-superimposed portions. In this configuration, the distance of electron flow in the first magnetic layer and the second magnetic layer are longer than the flow length in the superimposed portion.

When the non-magnetic layer 3 has a great electric resistance compared to the first and the second magnetic layer because of a great specific resistance or a small film thickness, the aforementioned problem will not occur. However, when the non-magnetic layer 3 has a low electric resistance, many electrons flow into the non-magnetic layer 3. The electrons which have flown into the non-magnetic layer 3 are not subjected to the filter effect by the magnetization direction of the first or the second magnetic layer and will not contribute to the resistance change ratio, thus lowering the resistance change ratio of the entire element. Accordingly, in this configuration, it is necessary to select a material having a high specific resistance for the non-magnetic layer 3 or to reduce the thickness of those portions of the non-magnetic layer 3 where the two magnetic layers are not superimposed.

Embodiments 3 and 4

FIG. 3 shows a magneto-resistive (MR) element according to a third embodiment of the present invention. FIG. 3(a) is a cross sectional view and FIG. 3(b) is a plan view. As shown in FIG. 3(a), the non-magnetic layer 3 covers almost the entire length of the second magnetic layer 2. FIG. 4 shows a magneto-resistive (MR) element according to a fourth embodiment of the present invention. FIG. 4(a) is a cross sectional view and FIG. 4(b) is a plan view. As shown in FIG. 4(a), the non-magnetic layer 3 covers almost the entire length of the first magnetic layer 1.

The third embodiment and the fourth embodiment exhibit characteristics between the first and the second embodiments. In these configurations, the distance of electron flow in the first and the second magnetic layer is longer than the distance of electron flow in the superimposed portion of the first and the second magnetic layer. Although not depicted, the present invention includes such a case that the non-magnetic layer 3 is provided on that part of the first magnetic layer 1 which is not superimposed by the second magnetic layer 2 and a case that the non-magnetic layer 3 is provided on that part of the second magnetic layer 2 which is not superimposed by the first magnetic layer 1.

Embodiment 5

FIG. 5 shows a magneto-resistive (MR) element according to a fifth embodiment of the present invention. FIG. 5(a) is a cross sectional view and FIG. 5(b) is a plan view. As shown in FIG. 5(a), the first magnetic layer 1, the non-magnetic layer 3, and the second magnetic layer 2 are coupled without any superimposed portion. In this configuration, electrons flow serially through the first magnetic layer 1, the non-magnetic layer 3, and the second magnetic layer 2. In principle, this is the most effective configuration.

Embodiments 6 and 7

FIG. 6 shows a magneto-resistive (MR) element according to a sixth embodiment of the present invention. FIG. 6(a) is a cross sectional view and FIG. 6(b) is a plan view. FIG. 7 shows a magneto-resistive (MR) element according to a seventh embodiment of the present invention. FIG. 7(a) is a cross sectional view and FIG. 7(b) is a plan view. Configurations shown in FIG. 6 and FIG. 7 are modifications of the configuration shown in FIG. 1. In FIG. 6, an area of the superimposed portion of the first and the second magnetic layer is almost identical to the area of the second magnetic layer. In FIG. 7, an area of the superimposed portion is almost identical to the area of the first magnetic layer 1. In either case, the distance of electron flow in one of the magnetic layers is too short and at the superimposed portions electrons pass through the two magnetic layers. Accordingly, there is a case that the resistance change ratio such as that of FIG. 1 and FIG. 5 cannot be obtained. However, in spite of such a demerit, these configurations have a merit that their production is easier.

Description will now be directed to a reproduction head using the magneto-resistive (MR) elements of FIG. 1, FIG. 5, and FIG. 7.

Embodiment 8

FIG. 8 shows a reproduction head according to an eighth embodiment of the present invention. FIG. 8(a) is a cross sectional view and FIG. 8(b) is a plan view. In this configuration, a patterned longitudinal bias layer 6 and an insulation layer 7 are arranged on a substrate (not depicted). The longitudinal bias layer 6 is divided into a right portion and a left portion and between them there is arranged a free layer 2a. Furthermore, a non-magnetic layer 3 is patterned and layered so as to superimpose the free layer 2a partially. Furthermore, a fixed layer la is layered so as to superimpose the non-magnetic layer 3 partially. The fixed layer 1a is covered by a fixing layer 5 which is formed from an antiferromagnetic layer for fixing the magnetization direction. An electrode 8a is in contact with that end of the fixed layer 1a which is not in contact with the non-magnetic layer 3, and an electrode 8b is in contact with that end of the free layer 2a which is not in contact with the non-magnetic layer 3.

Electrons mainly flow through a path 4. When electrons flow through the fixed layer 1a, only those electrons having a spin direction facilitating to flow with respect to the magnetization direction of the fixed layer 1a are made to flow and the electrons having an inverse spin direction barely flow. As a result, only the former flows through the non-magnetic layer 3 into the free layer 2a. Magnetization of the free layer 2a changes from a direction in which the electrons can easily pass, to a direction in which the electrons cannot easily pass. Consequently, the resistance between the two electrodes greatly changes according to the magnetization direction of the free layer 2a. In this embodiment, electrons can flow from the fixed layer 1a into the free layer 2a without being branched to the longitudinal bias layer 6 by adjusting the material and film thickness of the longitudinal bias layer 6 so as to have a sufficiently high resistance compared to the fixed layer 1a and the free layer 2a, it is possible to suppress branching without using the insulation layer 7.

Moreover, in this embodiment electrons flow from the fixed layer 1a into the free layer 2a. However, the same effect can be obtained when the electrons flow from the free layer 1a into the fixed layer 2a. This reproduction head is arranged between the lower shield layer/lower gap layer and the upper gap layer/upper shield layer and is used as a shield type reproduction head. However, it is also possible to use this head as a yoke type reproduction head by providing a magnetic path. It is also possible to provide a undercoat layer under the free layer 2a and to provide an upper layer on the fixing layer 5.

Embodiment 9

FIG. 9 shows a reproduction head according to a ninth embodiment of the present invention. FIG. 9(a) is a cross sectional view and FIG. 9(b) is a plan view. In this configuration, the fixed layer 1a, the non-magnetic layer 3, and the free layer 2a are arranged in a horizontal direction on a substrate (not depicted). The fixed layer 1a is covered with a fixing layer 5 formed from an antiferromagnetic layer for fixing the magnetization direction. Both ends of the free layer 2a are in contact with the longitudinal bias layers 6. The longitudinal bias layers 6 may be arranged apart from the ends of the free layer 2a. The electrode 8a is in contact with that side of the fixed layer 1a which is not in contact with the non-magnetic layer 3 and the electrode 8b is in contact with that side of the free layer 2a which is not in contact with the non-magnetic layer 3.

Thus, electrons flow between the two electrodes mainly through a path 4. When electrons flow through the fixed layer 1a, only those electrons having a spin direction facilitating to flow with respect to the magnetization direction of the fixed layer 1a are made to flow and the electrons having an inverse spin direction barely flow. As a result, only the former flows through the non-magnetic layer 3 into the free layer 2a. Magnetization of the free layer 2a changes from a direction in which the electrons can easily pass, to a direction in which the electrons cannot easily pass. Consequently, the resistance between the two electrodes greatly changes according to the magnetization direction of the free layer 2a. In this embodiment, the insulation layer 7 is provided so that electrons can flow from the fixed layer 1a into the free layer 2a without being branched to the longitudinal bias layer 6. However, by adjusting the material and film thickness of the longitudinal bias layer 6 so as to have a sufficiently high resistance compared to the fixed layer 1a and the free layer 2a, it is possible to suppress branching.

Moreover, in this embodiment electrons flow from the fixed layer 1a into the free layer 2a. However, the same effect can be obtained when the electrons flow from the free layer 1a into the fixed layer 2a. This reproduction head is arranged between a lower shield layer together with the lower gap layer and an upper gap layer together with the upper shield layer, and is used as a shield type reproduction head. However, it is also possible to use this head as a yoke type reproduction head by providing a magnetic path. It is also possible to provide a undercoat layer under fixed layer 1a, the non-magnetic layer 3, and the free layer 2a, and to provide an upper layer on the free layer 2a, the non-magnetic layer 3, and the fixing layer.

Embodiment 10

Figure 10B:
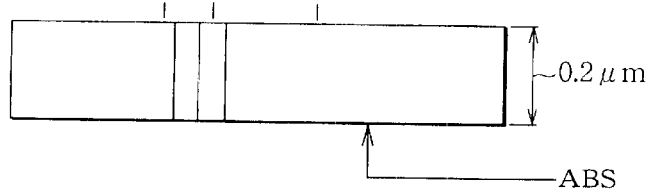

FIG. 10 shows a reproduction head according to a tenth embodiment of the present invention. FIG. 10(a) is a cross sectional view and FIG. 10(b) is a plan view. In this configuration, on a substrate (not depicted), there are layered a fixing layer 5, a fixed layer 1a, a non-magnetic layer 3, and a free layer 2a. Each of the layers is patterned. The non-magnetic layer 3 and the free layer 2a are shorter than the fixing layer 5 and the fixed layer 1a when viewed from the ABS surface. At the right and left of the fixing layer 5, there are arranged patterned electrodes 8a and 8b, and film thickness regulating layers 9a and 9b. The end of the free layer 2a is in contact with the electrode 8a, and the end of the fixed layer 1a is in contact with the electrode 8b. Thus, electrons flow between the electrodes mainly through a path 4. On the electrodes 8a and 8b and on the fixed layer 1a, an insulation layer 7 is patterned. Furthermore, at both ends of the free layer 2a, there is patterned a longitudinal bias layer 6.

In this embodiment, the insulation layer 7 is provided so that electrons flow from the free layer 2a into the fixed layer 1a without being branched to the longitudinal bias layer 6 or the like. However, by properly selecting the material and film thickness of the longitudinal bias layer so as to have a sufficiently high resistance compared to the fixed layer 1a and the free layer 2a, it is possible to suppress the branching without using the insulation layer 7.

Moreover, in this embodiment, electrons flow from the free layer 2a into the fixed layer 1a. However, the same effect can be obtained when the electrons flow from the fixed layer into the free layer 2a. This reproduction head is normally provided between the lower shield layer/lower gap layer and the upper gap layer/upper shield layer so as to be used as a shield type reproduction head. However, it is also possible to use this head as a yoke type reproduction head by providing a magnetic path. It is also possible to provide a undercoat layer under the fixing layer 5 and to provide an upper layer on the free layer 2a.

Here, the reproduction heads shown in FIG. 8 to FIG. 10 will be detailed.

Figure 11:
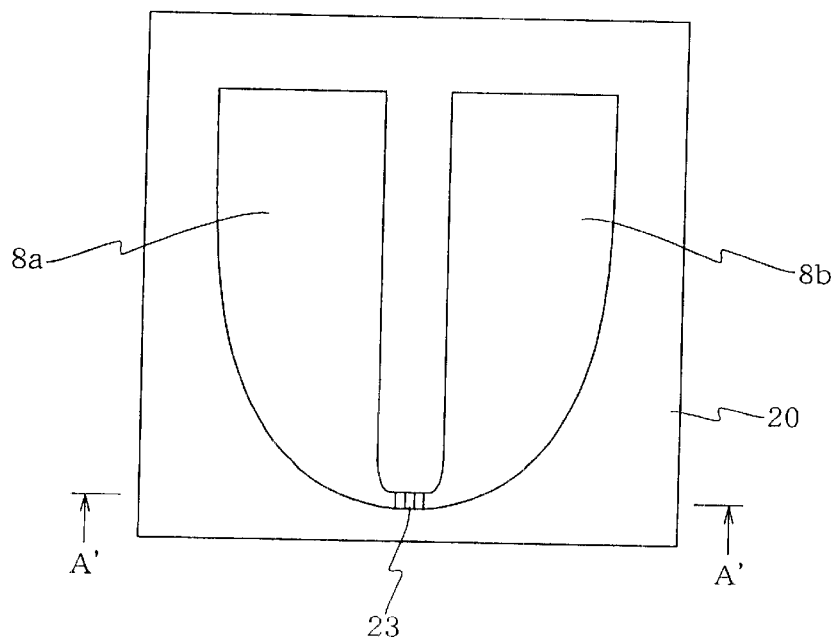
FIG. 11 is a plan view of a reproduction head.

FIG. 11 is a plan view of a reproduction head including the external view of the electrodes. As shown in FIG. 11, on a substrate 20, a lower shield layer and a lower gap layer (not depicted) are formed, and an MR film 23 is formed thereon. The MR film 23 is provided with the electrodes 8a and 8b.

Figure 12:
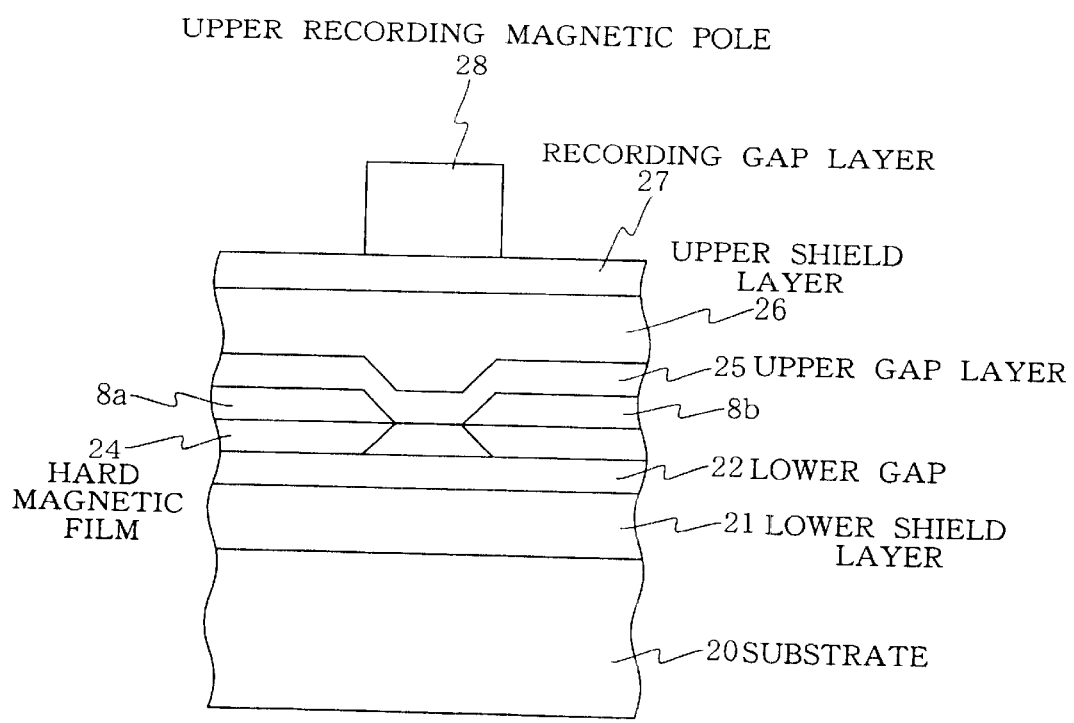
FIG. 12 is a cross sectional view about the line A–A' of FIG. 11.
Figure 13A:
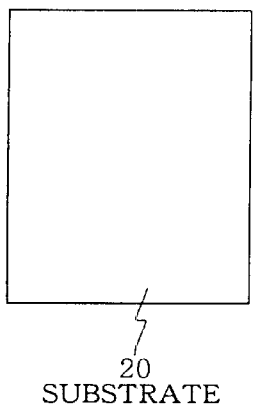
FIGS. 13(a)–13(f) are plan showing a production method of the MR head of FIG. 8.
Figure 13D:
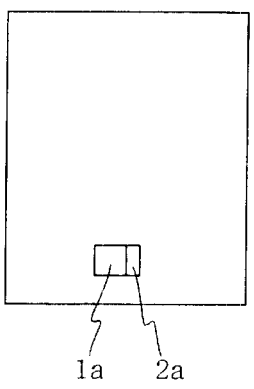
Figure 13G:
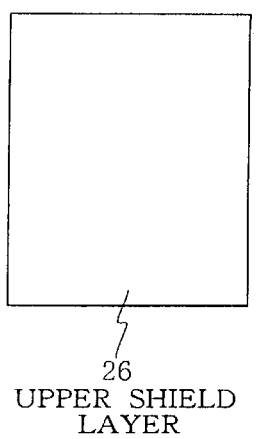
Figure 13B:
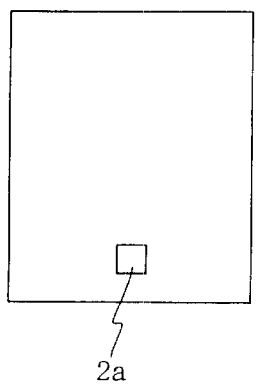
Figure 13E:
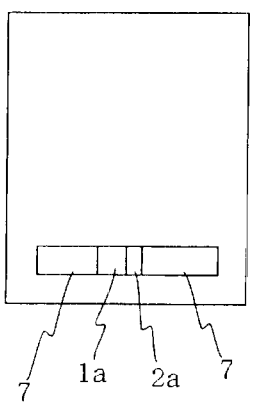
Figure 13H:
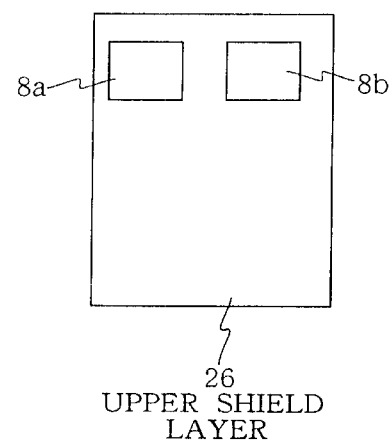
Figure 13C:
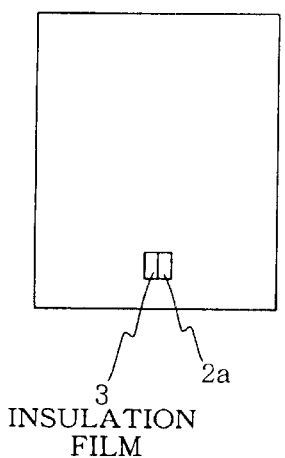
Figure 13F:
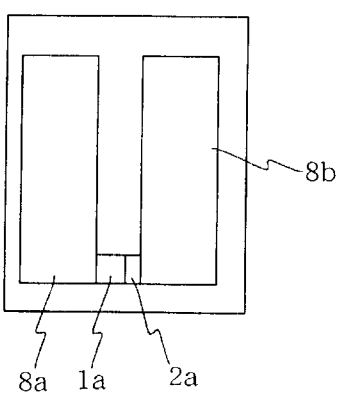
Figure 14A:
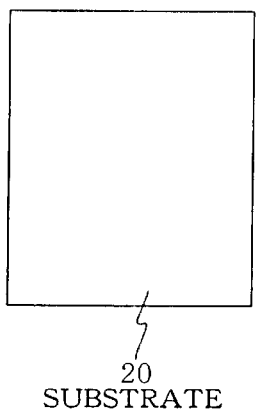
FIG. 14(a)–14(f) are plan showing a production method of the MR head of FIG. 9.
Figure 14D:
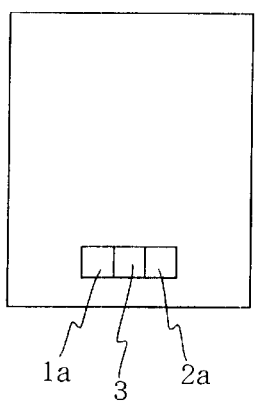
Figure 14G:
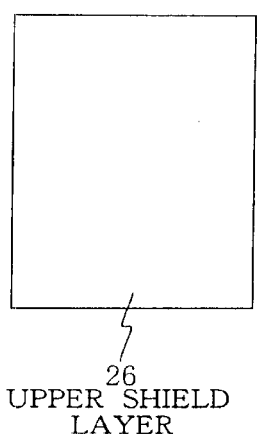
Figure 14B:
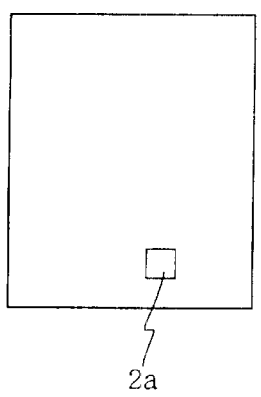
Figure 14E:
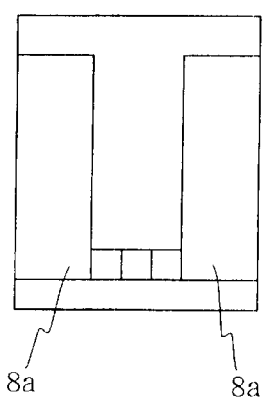
Figure 14H:
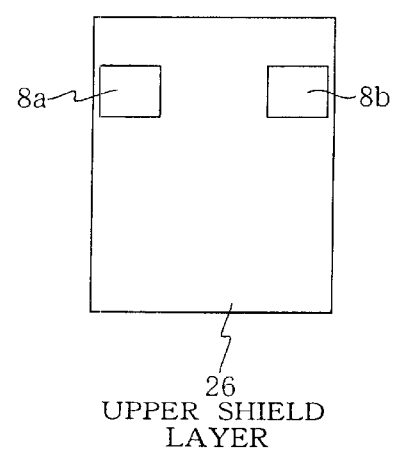
Figure 14C:
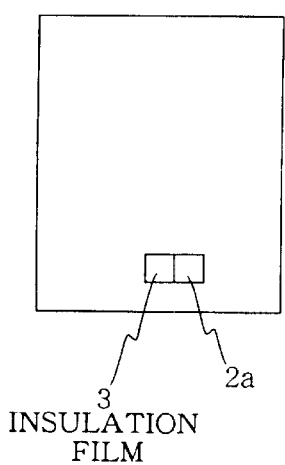
Figure 14F:
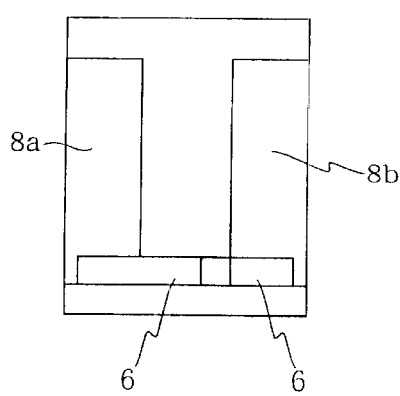

FIG. 12 is a cross sectional view about the line A–A' in FIG. 11. As shown in FIG. 12, on a substrate 20, a lower shield layer 21 and a lower gap layer 22 are layered and an MR film 23 is formed thereon. At both sides of the MR film 23, hard magnetic films 24 are formed. On the MR film 23 and the hard magnetic films 24, there are layered an upper gap layer 25, an upper shield layer 26, and a recording gap layer 27. The uppermost layer is an upper recording magnetic pole 28.

Here, explanation will be given on the detailed configuration, a representative production procedure, and a recording/reproduction head.

Firstly, components will be detailed. For example, it is preferable to use the following materials for the respective layers.

The substrate 20 is preferably formed from altic (alumina-titanium-carbide), SiC, alumina, altic/alumina, or Sic/alumina.

The lower shield layer 21 is preferably formed from NiFe, NiFeCo, CoZr, or CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, iron nitride, MnZn ferrite, NiZn ferrite, MgZn ferrite as a single layered film or multi-layered film or film made from a mixture of these materials.

The electrodes 8a and 8b are preferably made from Au, Ag, Cu, Mo, W, Y, Ti, Zr, Hf, V, Nb, Pt, or Ta as a single layered film or multi-layered film or a film made from a mixture of these materials.

The upper shield layer 26 is preferably made from NiFe, NiFeCo, CoZr, or CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, iron nitride, MnZn ferrite, NiZn ferrite, or MgZn ferrite as a single layered film or multi-layered film or a film made from a mixture of these materials.

The insulation layer 7 is preferably made from Al oxide, Si oxide, aluminium nitride, silicon nitride, or diamond-like carbon (DLC) as a single layered film or a multi-layered film, or a film made from a mixture of these materials.

The lower gap layer 22 is preferably made from Al oxide, Si oxide, aluminium nitride, silicon nitride, or diamond-like carbon as a single layered film or multi-layered film or a film made from a mixture of these materials.

The upper gap layer 25 is preferably made from Al oxide, Si oxide, aluminium nitride, silicon nitride, or diamond-like carbon as a single layered film or multi-layered film or a film made from a mixture of these materials.

The longitudinal bias layer 6 is preferably made from CoPrPt, CoCr, CoPt, CoCrTa, FeMn, NiMn, Ni oxide, NiCo oxide, Fe oxide, NiFe oxide, IrMn, PtMn, PtPdMn, ReMn, Co ferrite, or Ba ferrite as a single layered film or multi-layered film, or a film made from a mixture of these materials.

The MR film 23 may have compositions as one of following (1) to (5).

(1) substrate, undercoat layer, free layer, first MR enhance layer, barrier layer, second MR enhance layer, fixed layer, fixing layer, and protection layer (2) substrate, undercoat layer, fixing layer, fixed layer, first MR enhance layer, barrier layer, second MR enhance layer, free layer, and protection layer (3) substrate, undercoat layer, first fixing layer, first fixed layer, first MR enhance layer, barrier layer, second MR enhance layer, free layer, third MR enhance layer, barrier layer, fourth MR enhance layer, second fixed layer, second fixing layer, and protection layer (4) substrate, undercoat layer, fixed layer, first MR enhance layer, barrier layer, second MR enhance layer, free layer, and protection layer (5) substrate, undercoat layer, free layer, first MR enhance layer, barrier layer, second MR enhance layer, fixed layer, and protection layer Here, the undercoat layer is made from metal, oxide, or nitride as a single layered film or multi-layered film or a film made from a mixture of these materials. More specifically, the undercoat is made from Ta, Hf, Zr, W, Cr, Ti, Mo, Pt, Ni, Ir, Cu, Ag, Co, Zn, Ru, Rh, Re, Au, Os, Pd, Nb, V, or oxide or nitride of these materials as a single layered film or a film made from a mixture of these materials, or multi-layered film. As an element to be added, it is possible to use Ta, Hf, Zr, W, Cr, Ti, Mo, Pt, Ni, Ir, Cu, Ag, Co, Zn, Ru, Rh, Re, Au, Os, Pd, Nb, V. Furthermore, there is a case when no undercoat layer is used.

Moreover, the free layer may be made from NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or amorphous magnetic material.

Moreover, the non-magnetic layer may be made from Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ta, Pt, Ni, as a single substance, multi-layered film, or a film made from a mixture of these materials which may be used in combination with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ta, Pt, Ni as a single substance or multi-layered film or a film made from a mixture of these materials.

Moreover, the first and the second MR enhancement layer are made from Co, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or amorphous magnetic material. It should be noted that when no MR enhance layer is used, the MR ratio is slightly lowered but it has a merit that the number of production steps is reduced.

Moreover, the fixed layer may be made from NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or amorphous magnetic material. Alternatively, these can be used in combination with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ta, Pt, Ni as a single substance or to form an alloy or a layered film. In this case, preferable candidates are: Co/Ru/Co, CoFe/Ru/CoFe, CoFeNi/Ru/CoFeNi, Co/Cr/Co, CoFe/Cr/CoFe, and CoFeNi/Cr/CoFeNi.

Moreover, the fixing layer may be formed from FeMn, NiMn, IrMn, RhMn, PtPdMn, ReMn, PtMn, PtCrMn, CrMn, CrAl, TbCo, Ni oxide, Fe oxide, a mixture of Ni oxide and Co oxide, a mixture of Ni oxide and Fe oxide, film consisting of two layers of Ni oxide and Co oxide, film consisting of two layers of Ni oxide and Fe oxide, or CoCr, CoCrPt, CoCrTa, PtCo and the like. A preferable candidate is PtMn or PtMn added with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta.

Furthermore, the protection layer is made from oxide, nitride, mixture of oxide and nitride, a layered film of metal and oxide, a layered film of metal and a mixture of oxide and nitride. It is possible to use oxide, nitride, layered film, or mixture of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Ni. Alternatively, it is possible to use these materials in combination with oxide or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Ni as a simple substance, layered film of simple substances or a mixture. It should be noted that the protection layer may not be used.

Next, explanation will be given on a production procedure of the reproduction heads shown in FIG. 8 to FIG. 10.

FIG. 13 shows a representative production procedure of the reproduction head having the MR film of FIG. 8.

Firstly, a lower shield layer 21, a lower gap layer 22, and a free layer 2*a* are successively formed on a substrate 20. The lower shield layer 21 and the lower gap layer 22 are patterned by a photoresist mask formation step (hereinafter, referred to as PR step) and lift off or milling step. A photoresist mask (hereinafter, referred to as PR) is formed thereon, the free layer 2*a* is patterned by milling, and the longitudinal bias layer 6 and the insulation layer 7 are formed before lift off is performed (a, b, c).

Next, the non-magnetic layer 3 is formed and patterned by the PR formation and milling.

Next, the fixed layer 1*a* and the fixing layer 5 are formed and patterned by the PR formation and milling. A PR is formed thereon, and the insulation layer 7 and the longitudinal bias layer 6 are patterned by milling (c, d, e).

Next, a PR is formed, an electrode film is formed, and lift off is performed to form electrodes 8*a* and 8*b* (f). It should be noted that another electrode may be superimposed at a portion slightly recessed from the magneto-resistive (MR) element of the electrodes 8*a*, 8*b*, so as to reduce the resistance of the electrodes.

Next, an upper gap layer 25 and an upper shield layer 26 are formed and patterned by PR formation and milling or lift off (g). It should be noted that it is often the case that the upper shield layer 26 also serves as a lower pole of a recording head formed on the upper shield layer 26.

Finally, a part of the upper gap film 25 formed on the electrodes 8*a*, 8*b* is removed by milling so as to expose the electrodes 8*a*, 8*b* to serve as electrode terminals. Although not depicted in FIG. 13, a recording head block is formed thereon. Lapping is performed to remove unnecessary portions to complete a recording/reproduction head with the magneto-resistive (MR) element exposed to the ABS surface. After this, for protection of the magnetic tunneling junction (MTJ) element, it is possible to form a film using a shock resistant material such as diamond-like carbon.

FIG. 14 shows a representative production procedure of the reproduction head having the MR film of FIG. 9.

Firstly, a lower shield layer 21, a lower gap layer 22, and a free layer 2*a* are successively formed on a substrate 20. The lower shield layer 21 and the lower gap layer 22 are patterned by a PR mask formation step and lift off or milling step. A PR is formed thereon and the free layer 2*a* is patterned by milling (a, b).

Next, the non-magnetic layer 3 is formed and patterned by the PR formation and milling (c).

Next, the fixed layer 1*a* and the fixing layer 5 are formed and patterned by the PR formation and milling (d).

Next, a PR is formed, an electrode film is formed, and lift off is performed to form electrodes 8*a* and 8*b* (e). It should be noted that another electrode may be superimposed at a portion slightly recessed from the magneto-resistive (MR) element of the electrodes 8*a*, 8*b*, so as to reduce the resistance of the electrodes.

Next, a longitudinal bias layer 6 is formed and patterned by the PR formation and milling (f).

Next, an upper gap layer 25 and an upper shield layer 26 are formed and patterned by PR formation and milling or lift off. It should be noted that it is often the case that the upper shield layer 26 also serves as a lower pole of a recording head formed on the upper shield layer 26.

Lastly, a part of the upper gap film 25 formed on the electrodes 8*a*, 8*b* is removed by milling so as to expose the electrodes 8*a*, 8*b* to serve as electrode terminals. Although not depicted in FIG. 14, a recording head block is formed thereon. Lapping is performed to remove unnecessary portions to complete a recording/reproduction head with the magneto-resistive (MR) element exposed to the ABS surface. After this, for protection of the MTJ element, it is possible to form a film using a shock resistant material such as diamond-like carbon.

FIG. 15 shows a representative production procedure of the reproduction head having the MR film of FIG. 10.

Firstly, a lower shield layer 21, a lower gap layer 22, a free layer 2*a*, a non-magnetic layer 3, a fixed layer 1*a*, and a fixing layer 5 are successively formed on a substrate 20. The lower shield layer 21 and the lower gap layer 22 are patterned by a PR mask formation step and lift off or milling step. A PR is formed thereon and the fixing layer 5, the fixed layer 1*a*, and the non-magnetic layer 3 are patterned by milling.

Next, a PR is formed and the fixing layer 5, the fixed layer 1*a*, and the non-magnetic layer 3 are patterned by milling.

Next, film thickness regulating layers 9*a* and 9*b* are formed, and the fixing layer 5, the fixed layer 1*a*, and the non-magnetic layer 3 are patterned by PR formation and milling.

Next, a PR is formed, an electrode film and an insulation film are formed, and lift off is performed to form electrodes 8*a* and 8*b* (e). It should be noted that another electrode may be superimposed at a portion slightly recessed from the magneto-resistive (MR) element of the electrodes 8*a*, 8*b*, so as to reduce the resistance of the electrodes.

Next, a longitudinal bias layer 6 is formed and patterned by the PR formation and milling.

Next, an upper gap layer 25 and an upper shield layer 26 are formed and patterned by PR formation and milling or lift off. It should be noted that it is often the case that the upper shield layer 26 also serves as a lower pole of a recording head formed on the upper shield layer 26.

Lastly, a part of the upper gap film 25 formed on the electrodes 8*a*, 8*b* is removed by milling so as to expose the electrodes 8*a*, 8*b* to serve as electrode terminals. Although not depicted in FIG. 15, a recording head block is formed thereon. Lapping is performed to remove unnecessary portions to complete a recording/reproduction head with the magneto-resistive (MR) element exposed to the ABS surface. After this, for protection of the MTJ element, it is possible to form a film using a shock resistant material such as diamond-like carbon.

Next, explanation will be given on a magnetic recording/ reproduction head and recording/reproducing apparatus according to the present invention.

Embodiment 11

Figure 16:
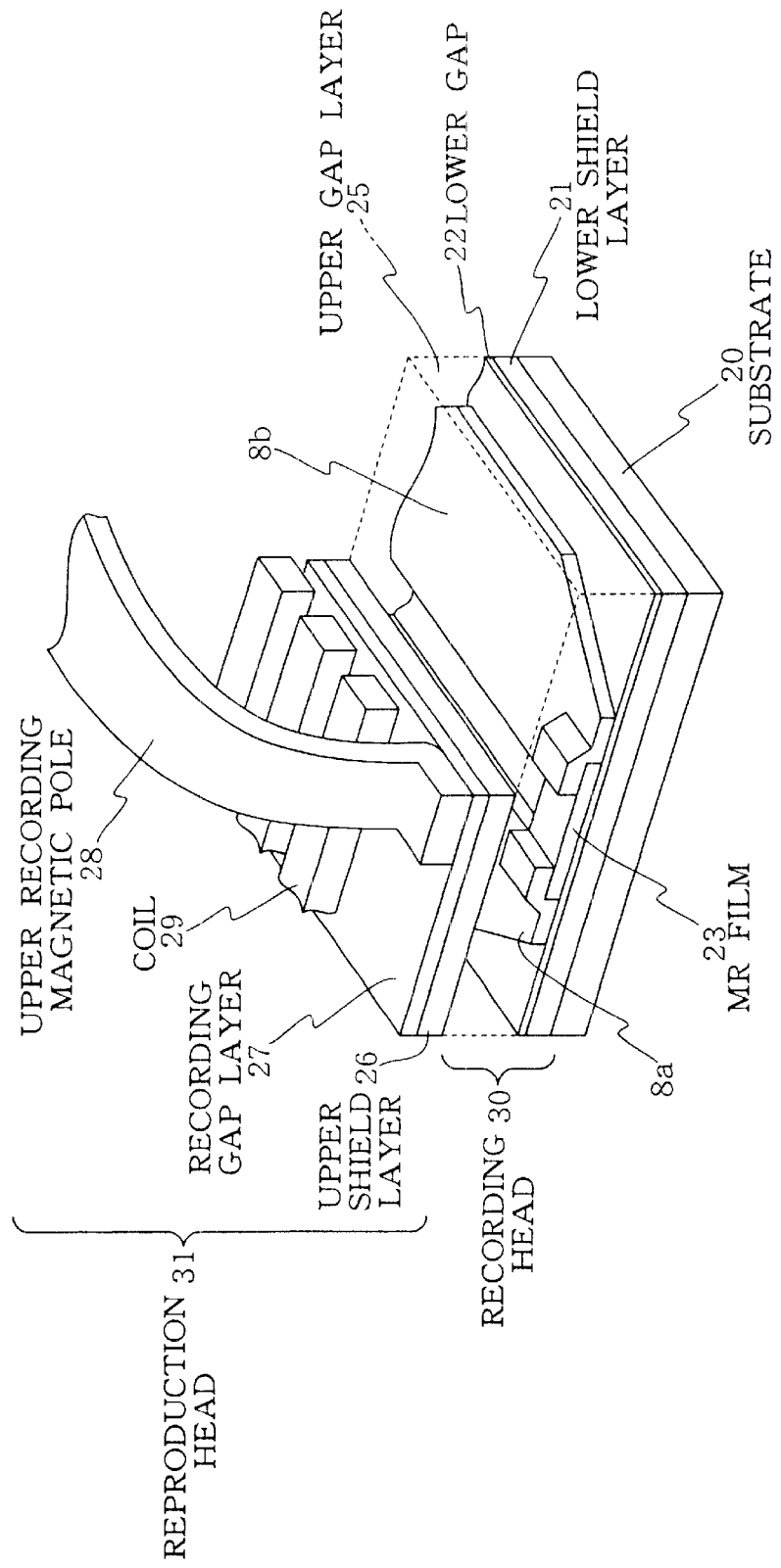
FIG. 16 is a perspective view of a magnetic recording/reproduction head according to an eleventh embodiment of the present invention.

FIG. 16 is a perspective view of a magnetic recording/ reproduction head according to an eleventh embodiment of the present invention. The magnetic recording/reproduction head of this embodiment consists of a reproduction head 30 and a recording head 31.

The reproduction head 30 includes a substrate 20, a lower shield layer 21, a lower gap layer 22, an MR film 23, electrodes 8a, 8b, an upper gap layer 25, and a hard magnetic film (not depicted).

The recording head 31 includes an upper shield layer 26 formed on the upper gap layer 25, a recording gap 27, an upper recording magnetic pole 28, and a coil 29.

It should be noted that in this embodiment, the upper shield layer 26 also serves as the lower magnetic film. However, these may also be prepared separately.

Using this magnetic recording/reproduction head, it is possible to write a signal onto a magnetic recording medium and read the signal from the magnetic recording medium. Thus, the sensitive portion of the reproduction head 30 and the magnetic gap of the recording head 31 are superimposed on a slider, and it is possible to perform simultaneous positioning against a track. The slider is mounted on the magnetic recording/reproducing apparatus as shown in FIG. 17.

Embodiment 12

Figure 17:
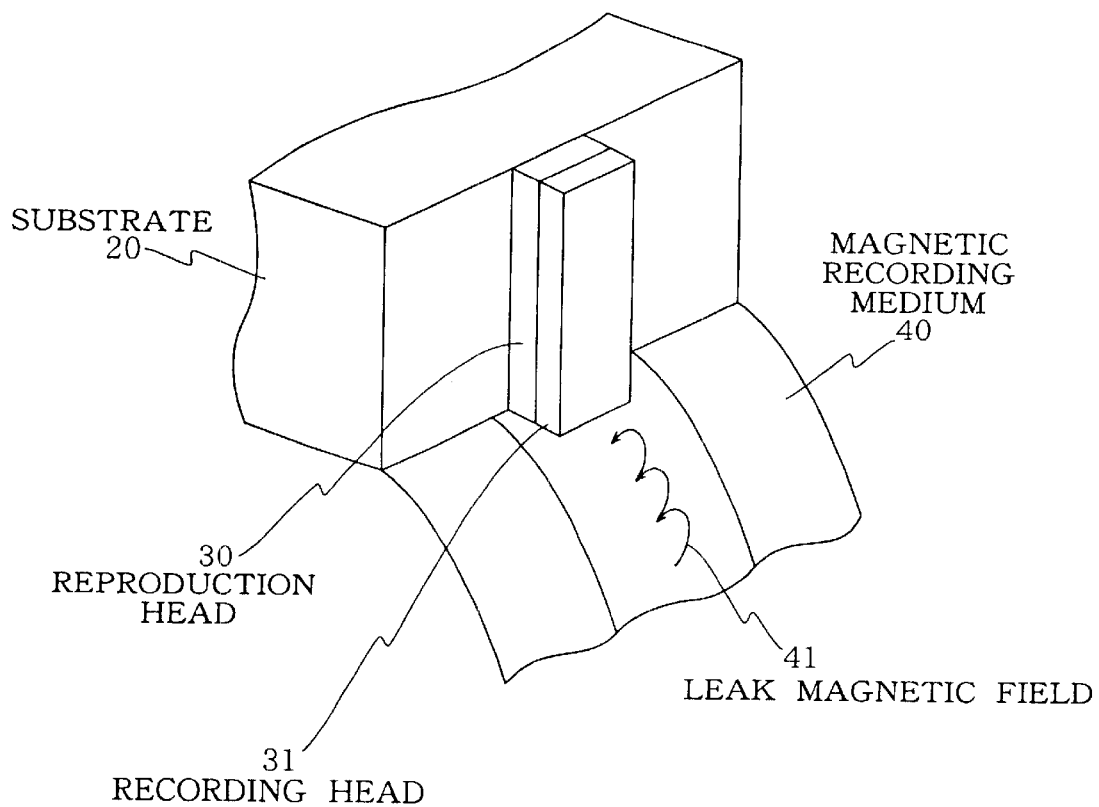
FIG. 17 is a perspective view of a magnetic recording/reproduction head according to a twelfth embodiment of the present invention.

FIG. 17 is a perspective view of a magnetic recording/reproducing apparatus according to a twelfth embodiment of the present invention. As shown here, the reproduction head 30 and the recording head 31 are mounted on the substrate 20 serving also as a head slider. This is positioned on a magnetic recording medium 40 for reproduction. While the magnetic recording medium 40 is rotated, the head slider is at a height of 0.2 micrometers above the magnetic recording medium 40 or in contact with the magnetic recording medium and moves relatively. With this mechanism, the reproduction head 30 is set to a position capable of reading a magnetic signal recorded on the magnetic recording medium through a leak magnetic field 41.

EXAMPLES

Next, explanation will be given on examples of the present invention.

We prepared reproduction heads (present invention) having the MR film of FIG. 8 to FIG. 10 and a reproduction head (conventional example) having the MR film of FIG. 2. The MR film included Ta (3 nm), $Pt_{46}Mn_{54}$ (15 nm), $Co_{90}Fe_{10}$ (1.5 nm), Ru (0.8 nm), $Co_{90}Fe_{10}$ (2 nm), $Ni_{82}Fe_{18}$ (4 nm), and Ta (3 nm). After the film formation, the film was subjected to thermal treatment at 250 degrees C for 5 hours while being subjected to 5 kOe magnetic field in a direction vertical to the direction of the magnetic field during the film formation.

The components of the head were as follows.

Substrate: alumina 10 micrometers on the 2 mm altic

Reproduction Head

Lower shield layer: $Co_{89}Zr_4Ta_4Cr_3$ (1 micrometer) (note that the compositions are indicated by at %)

Lower gap layer: alumina (20 nm)

Lower gap thickness regulating layer: alumina (40 nm)

Electrode layer: Ta (1.5 nm)/Au (40 nm)/Ta (3 nm)

Electrode thickness regulating layer: Ta (1.5 nm)/Au (100 nm)/Ta (3 nm)

Insulation layer: alumina (20 nm)

Longitudinal bias layer: Cr (5 nm)/$Co_{74.5}Cr_{10.5}Pt_{15}$ (15 nm)

Upper gap layer: alumina (40 nm)

Upper gap thickness regulating layer: alumina (40 nm)

Upper shield layer: shared by the lower pole of the recording head

Recording Head

Shared pole undercoat: $Ni_{82}Fe_{18}$ (90 nm)

Shared pole: $Ni_{82}Fe_{18}$ (2.5 micrometers)/$Co_{65}Ni_{12}Fe_{23}$ (0.5 micrometers)

Recording gap: alumina (0.3 micrometers)

Gap thickness regulating layer: alumina (0.7 micrometers)

Coil undercoat: Cr (30 nm)/Cu (150 nm)

Coil: Cu (4.5 micrometers)

Upper pole undercoat: Ti (10 nm) $Co_{65}Ni_{12}Fe_{23}$ (0.1 micrometers)

Upper pole: $Co_{65}Ni_{12}Fe_{23}$ (0.5 micrometers)/$Ni_{82}Fe_{18}$ (3.5 micrometers)

Terminal undercoat: Cr (30 nm)/Cu (150 nm)

Terminal: Cu (50 micrometers)

Overcoat: alumina (52 micrometers)

Gold terminal undercoat: Ti (10 nm)/$Ni_{82}Fe_{18}$ (0.1 micrometers)

Gold terminal: Au (3 micrometers)

The head production procedure was as follows.

[1] Producing a reproduction head block
1) substrate cleaning
2) lower shield formation and anneal
3) alignment mark formation (PR formation, patterning, and PR removal)
4) lower shield patterning (PR formation, taper treatment, PR removal)
5) lower gap formation (PR formation, film formation, lift off)
6) lower gap thickness regulation (PR formation, film formation, lift off)

These steps are identical in the case of FIG. 19 (conventional example) and in FIG. 8 to FIG. 10.

The following steps are different depending on the configurations.

[Case of FIG. 19 (Conventional Example)]
1) formation of an undercoat, a free layer, a non-magnetic layer, a fixed layer, a fixing layer, and a protection layer
2) patterning (PR formation and milling) of the undercoat, the free layer, the non-magnetic layer, the fixed layer, the fixing layer, and the protection layer
3) film formation of a longitudinal bias layer and an electrode layer
4) lift off
5) patterning (PR formation and milling) of the longitudinal bias layer and the electrode layer
6) formation of an electrode thickness regulating layer (PR formation, film formation, and lift off)

[Case of FIG. 8]
1) film formation of an undercoat layer and a free layer
2) patterning (PR formation, milling, and PR removal) of the undercoat layer and the free layer
3) film formation of a longitudinal bias film
4) patterning (PR formation, film formation, lift off) of the longitudinal bias film
5) film formation of a non-magnetic layer
6) patterning (PR formation, milling, PR removal) of the non-magnetic layer
7) film formation of a fixed layer, a fixing layer, and a protection layer
8) patterning (PR formation, milling, and PR removal) of the fixed layer, the fixing layer, and the protection layer 9) patterning (PR formation, milling, and PR removal) of the longitudinal bias layer 10) electrode formation (PR formation, film formation, and lift off)

11) electrode thickness regulating layer formation (PR formation, film formation, and lift off)

[Case of FIG. 9]

1) film formation of an undercoat layer and a free layer 2) patterning (PR formation, milling, and PR removal) of the undercoat layer 1 and the free layer 3) film formation of an undercoat layer 2 and a non-magnetic layer 4) patterning (PR formation, milling, and PR removal) of the undercoat layer 2 and the non-magnetic layer 5) film formation of an undercoat layer 3, a fixed layer, and a fixing layer 6) patterning (PR formation, milling, and PR removal) of the undercoat layer, the fixed layer, and the fixing layer 7) electrode formation (PR formation, film formation, lift off)

8) formation (PR formation, film formation, lift off) of an electrode thickness regulating layer 9) longitudinal bias formation (film formation, PR formation, milling, and PR removal)

[Case of FIG. 10]

1) formation of an undercoat layer, a free layer, a non-magnetic layer, a fixed layer, a fixing layer, a protection layer 2) patterning (PR formation, milling, and PR removal) of the undercoat layer, the free layer, the non-magnetic layer, the fixed layer, the fixing layer, and the protection layer 3) patterning (PR formation, milling, and PR removal) of the free layer and the protection layer 4) electrode formation (PR formation, film formation, and lift off)

5) formation of an electrode thickness regulating layer (PR formation, film formation, and lift off)

6) longitudinal bias formation (film formation, PR formation, milling, and PR removal)

The following steps are identical for all the configurations.

1) pole height monitor formation (PR formation, film formation, and lift off)

2) upper gap formation (PR formation, film formation, and lift off)

3) upper gap thickness regulating layer formation (PR formation, film formation, and lift off)

[2] Producing a Recording Head Block

The recording head block was prepared in the same way for all the examples.

1) shared pole formation (formation of a second undercoat film, frame PR formation, shared pole plating, cover PR formation, chemical etching, undercoat removal)

2) application of photoresist for flattening at a pole height 3) formation of a gap film 4) formation of a gap thickness regulating film (PR formation, film formation, lift off)

5) formation of a pole window (PW) (for magnetically connecting the upper pole to the shared pole)(PR formation, milling, PR removal)

6) formation of a step cover (SC) 1 photoresist (photoresist 1 for assuring coil insulation)

7) formation of a coil (undercoat formation, PR formation, coil plating, chemical etching, undercoat removal)

8) step cover (SC) 2 photoresist (photoresist 2 for assuring coil insulation)

9) gap regulating milling 10) formation of an upper pole (undercoat formation, frame photoresist formation, upper pole plating, annealing the plated upper pole, undercoat removal, cover PR formation, chemical etching, undercoat removal)

11) terminal formation (undercoat formation, PR formation, terminal plating, chemical etching, undercoat removal)

12) overcoat formation 13) terminal lapping 14) gold terminal plating (undercoat formation, PR formation, undercoat removal)

In the write-in head block coil formation, the photoresist was hardened at 250 degrees C for 2 hours. Because this step rotated the magnetization direction of the fixed layer and the fixing layer which should be orientated in the element height direction, and the magneto-resistive (MR) element could not operate correctly, after completion of the reproduction head block and the recording head block, they were subjected to magnetization-thermal treatment at 200 degrees C in a magnetic field of 500 Oe for 1 hour. This did not affect the free layer. That is, the magnetization axis of the free layer did not rotate to the magnetization direction judging from the magnetization curve.

[3] Post Processing

The post processing was performed in the same way for all the examples.

1) cutting into rows

2) ABS surface lapping

3) DLC film formation on the ABS surface 4) slider processing for floating 5) suspension mounting Dimensions of the fixed, layer, the free layer, and the superimposed portion of the fixed layer and the free layer were as shown in FIG. 19 and FIG. 8 to FIG. 10. Here, for impartial comparison, width of the free layer as a magnetic field direction portion was set to 0.5 micrometers and the element height significantly affecting the output was set to 0.2 micrometers.

The heads thus prepared were used for recording and reproducing a data onto/from a CoCrTa medium. The write track width was set to 1.5 micrometers, the write gap was set to 0.2 micrometers, and the read track width was set to 0.5 micrometers. The coercive force of the medium was set to 5.0 kOe, and the Mrt was set to 0.35 memu/cm$^2$. The heads thus prepared had recording/reproducing characteristics as shown in Table 1.

TABLE 1

|  | Reproduction output (mV) |
|---|---|
| FIG. 19 (conventional) | 1.4 |
| FIG. 8 | 1.8 |
| FIG. 9 | 1.9 |
| FIG. 10 | 1.6 |

As is clear from this table, the examples of FIG. 8 to FIG. 10 according to the present invention show improved reproduction outputs compared to the conventional example of FIG. 19. The improvement is 36% at maximum which is not so great. The reason is considered to be that the element was not small enough, i.e., in the order of 0.5 micrometers, to exhibit a sufficient effect of the present invention. In future, when the fine processing technique makes an advance to prepare an element of 0.1 micrometers or less, the reproduction output improvement obtained by the present invention is expected to be more remarkable.

Next, explanation will be given on a magnetic disc apparatus prepared according to the present invention. The magnetic disc apparatus comprises three magnetic discs on its base and at the back surface of the base, there are provided a drive circuit, a signal processing circuit, and an I/O interface. The magnetic disc apparatus is connected with outside via a 32-bit bus line. Each of the magnetic discs is sandwiched by a pair of heads and accordingly, six heads in all are arranged. A rotary actuator for driving the heads, a control circuit, and a spindle connected motor for disc rotation are mounted. The disc diameter is 46 mm and the data plane is between the diameters of 10 mm and 40 mm.

Because of the buried servo type not requiring a servo surface, it is possible to obtain a high density. This apparatus can directly be connected as an external storage apparatus for a small-size computer. For the I/O interface, a cache memory is mounted, corresponding to a bus line having a transfer speed of 5 to 20 mega bytes per second. Moreover, a plurality of the apparatuses can be connected through an external controller so as to constitute a large-capacity magnetic disc apparatus.

As has been described above, according to the present invention, the sense current flowing distance in the first magnetic layer and/or the sense current flowing distance in the second magnetic layer is longer than the sense current flowing distance in the superimposed portion of the first magnetic layer, the non-magnetic layer, and the second magnetic layer. Accordingly the present invention can provide a magneto-resistive (MR) element, an MR head, and a magnetic recording/reproducing apparatus capable of obtaining a higher reproduction output than by the conventional ones.

Moreover, the present invention enables to produce the aforementioned magneto-resistive (MR) element with a preferable yield.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-101490 (Filed on Apr. 8th, 1999) including specification, claims, drawings and summary are incorporated herein by reference in its entirety.

What is claimed is:

1. A magneto-resistive (MR) element comprising:
   a first magnetic layer provided on a substrate;
   a non-magnetic layer arranged to be in contact with the first magnetic layer;
   and a second magnetic layer arranged to be in contact with the non-magnetic layer,
   wherein a first sense current flows in the first magnetic layer and a second sense current flows in the second magnetic layer, and
   wherein the first sense current flowing distance and the second sense current flowing distance are respectively longer than a sense current flowing distance in a superimposed portion formed by partially overlapping areas of the first magnetic layer, the non-magnetic layer, and the second magnetic layer.

2. The magneto-resistive (MR) element as claimed in claim 1, wherein when the substrate is viewed from a direction vertically intersecting the main surface of the substrate, the superimposed portion of the first magnetic layer and the second magnetic layer has an area smaller than each of an area of the first magnetic layer and an area of the second magnetic layer.

3. An MR head having a magneto-resistive (MR) element according to claim 2, further comprising:
   a first electrode mounted on the first magnetic layer;
   a second electrode mounted on the second magnetic layer; and
   a fixing layer arranged to be in contact with the first magnetic layer for fixing the magnetization direction of the first magnetic layer.

4. A magnetic recording and reproducing apparatus having the MR head according to claim 3, further comprising:
   a magnetic recording medium having a plurality of tracks for recording data;
   a magnetic recording head for storing data in the magnetic recording medium; and
   actuator means for moving the magnetic recording head and the MR head to a desired track on the magnetic recording medium.

5. A magnetic recording and reproducing apparatus according to claim 4, wherein the magnetic recording medium comprises a hard disc.

6. An MR head having a magneto-resistive (MR) element according to claim 1, further comprising:
   a first electrode mounted on the first magnetic layer;
   a second electrode mounted on the second magnetic layer; and
   a fixing layer arranged to be in contact with the first magnetic layer for fixing the magnetization direction of the first magnetic layer.

7. A magnetic recording and reproducing apparatus having the MR head according to claim 6, further comprising:
   a magnetic recording medium having a plurality of tracks for recording data;
   a magnetic recording head for storing data in the magnetic recording medium; and
   actuator means for moving the magnetic recording head and the MR head to a desired track on the magnetic recording medium.

8. A magnetic recording and reproducing apparatus according to claim 7, wherein the magnetic recording medium comprises a hard disc.

* * * * *